United States Patent
Shimamura et al.

[11] Patent Number: 6,094,133
[45] Date of Patent: Jul. 25, 2000

[54] METHOD OF DISPLAYING INFORMATION BY USING AN LC RESONANCE TAG

[75] Inventors: Chikara Shimamura; Tsutomu Sakamoto, both of Tokyo, Japan

[73] Assignee: Sensor Technos Co., Ltd., Tokyo, Japan

[21] Appl. No.: 09/012,018

[22] Filed: Jan. 22, 1998

[51] Int. Cl.$^7$ ............... G08B 26/00; G08B 13/14
[52] U.S. Cl. ............ 340/505; 340/572.1; 340/10.1; 340/10.42; 340/10.6; 235/385
[58] Field of Search ............... 340/505, 572, 340/825.54, 572.8, 572.3, 572.1, 10.1, 10.42, 10.6; 235/375, 378, 385

[56] References Cited

U.S. PATENT DOCUMENTS

| | | | |
|---|---|---|---|
| 4,356,477 | 10/1982 | Vandebult | 340/572 |
| 5,012,225 | 4/1991 | Gill | 340/572.8 |
| 5,119,070 | 6/1992 | Matsumoto et al. | 340/572 |
| 5,381,137 | 1/1995 | Ghaem et al. | 340/572 |
| 5,583,489 | 12/1996 | Loemker et al. | 340/572.8 |
| 5,608,380 | 3/1997 | Hogen Esch | 340/572 |
| 5,661,470 | 8/1997 | Karr | 340/572 |
| 5,781,110 | 7/1998 | Habeger, Jr. et al. | 340/572 |
| 5,786,764 | 7/1998 | Engellenner | 340/572 |

*Primary Examiner*—Donnie L. Crosland
*Attorney, Agent, or Firm*—Fattibene & Fattibene; Paul A. Fattibene; Arthur T. Fattibene

[57] ABSTRACT

To discriminate counterfeit articles by incorporating invisible ID information recording apparatus in the true articles. An LC resonance tag 1 is buried in the articles 21 and 22 at the time when they are being produced in compliance with the contraction of a license. Upon bringing transmission and reception antenna units 15, 16 of a reflected wave analyzer 11 close to the articles, the resonance frequencies of the LC resonance tags 1 are specified, and voice messages such as brand, name of article, explanation of article, etc. are produced from a speaker of the reflected wave analyzer 11 based on the display data related to the resonance frequencies, verifying that the articles are true ones.

9 Claims, 9 Drawing Sheets

METHOD OF DISPLAYING INFORMATION BY USING AN LC RESONANCE TAG

FIELD OF THE INVENTION

The present invention relates to a method of displaying information by using an LC resonance tag. More particularly, the invention relates to a method of displaying information adapted to inspecting whether the article is a true one or a false one and inspecting the history of unsealing.

BACKGROUND OF THE INVENTION

Counterfeit articles imitating true articles have heretofore been appearing on the commodity market. Some counterfeit articles have been so skillfully produced that it is often difficult to determine whether they are true ones or false ones. The presence of illegal counterfeit products disturbs the order in the market and, particularly, a flood of goods copying products of famous brands is creating a social problem. It can therefore be contrived to attach information-recording means such as a seal or a tag to a true article, read ID information by an information read/display means in a stage of distribution to distinguish the true article from the counterfeit articles.

As means for displaying ID information of articles, there has heretofore been widely used an article managing/cash registering system based upon ID information by using bar codes. However, a seal or a tag with a printed bar code which is visible information can be easily forged, detached and attached, and is not sufficient as an information display system from the standpoint of discriminating counterfeit articles. In order to constitute an article information display system adapted to inspecting the true and counterfeit articles, therefore, it becomes necessary to use an ID information-recording means that cannot be forged or replaced to substitute for visible information recording means such as bar codes.

Furthermore, when a person who contracts a license with an owner of an industrial property produces products on license, a conflict may occur concerning the contract of license unless the owner of the industrial property correctly grasps the number of the products produced on license. Such a trouble concerning the contract can be effectively avoided and the number of the license products that are produced can be controlled by the owner of the industrial property if the owner of the industrial property offers, to the licensee, ID information-recording means of a quantity based on the contract of license that cannot be forged, and if the articles are provided with the ID information-recording means in a stage of production.

Therefore, there arises a technical problem that must be solved to provide a method of displaying ID information that is adapted to inspecting the true and false articles and to controlling the number of the products by using information-recording means that cannot be formed or replaced and that can be employed for a great number of items of products. The object of the present invention is to solve the above-mentioned problem.

SUMMARY OF THE INVENTION

In order to accomplish the above-mentioned object, the present invention provides a method of displaying information by using a reflected wave analyzer which causes a frequency sweeping transmitter to oscillate sweeping electromagnetic waves, compares the transmitted waveform with a waveform received by a receiver, detects the presence of waves in an electric field reflected by an LC resonance circuit and the waveform of the reflected waves, and, when the reflected wave is detected, displays information based on the ID data corresponding to the waveform of the reflected wave that is detected and on the information display data, and by using an LC resonance tag forming the LC resonance circuit, wherein said LC resonance tag having the LC resonance circuit constituted by forming electrically conducting spiral patterns on both surfaces of a dielectric film is buried in an article so that it is not visible and cannot be removed at the time when the article is being produced, and brand of the article, name of the article and any other message are stored as display information of the reflected wave analyzer, and when the reflected wave of the LC resonance tag is detected, information is displayed by voice, by picture, or by voice and picture relying upon the display information corresponding to the waveform of the reflected wave that is detected.

The invention further provides a method of displaying information by using an LC resonance tag, wherein the LC resonance tag having the LC resonance circuit constituted by forming electrically conducting spiral patterns on both surfaces of a dielectric film is stuck to a package or a wrapping of an article and is sealed in a manner that the LC resonance tag is destroyed and the resonance circuit loses its function when the article is unsealed, and brand of the article, name of the article and any other message are stored as display information of the reflected wave analyzer, and when the reflected wave of the LC resonance tag is detected, information is displayed by voice, by picture, or by voice and picture relying upon the display information corresponding to the waveform of the reflected wave that is detected.

Moreover, the invention provides a method of displaying information by using an LC resonance tag, wherein a plurality of LC resonance tags having different resonance frequencies are contained in, or stuck to, an article, and, when reflected waves from said plurality of LC resonance tags are detected by sweeping the transmission frequency, information is displayed by voice, by picture, or by voice and picture relying upon the ID data and the display information corresponding to a combination of the waveforms of the reflected waves that are detected.

DETAILED DESCRIPTION OF THE PREFERRED EMBODIMENTS

Figure 1:
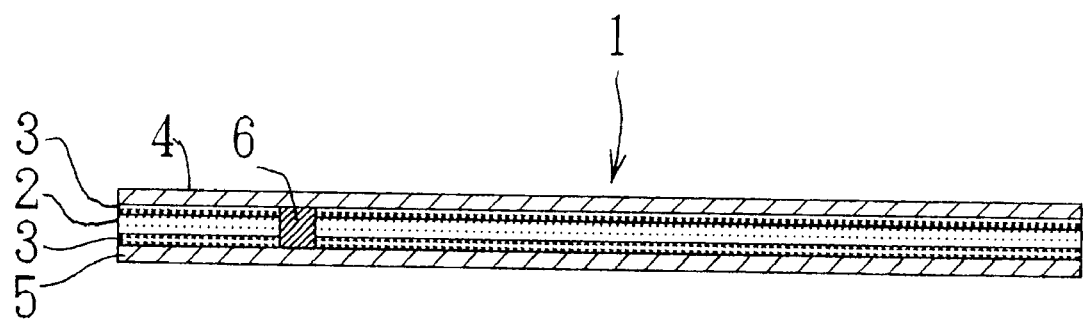
FIG. 1 is a sectional view of an LC resonance tag.
Figure 2A:
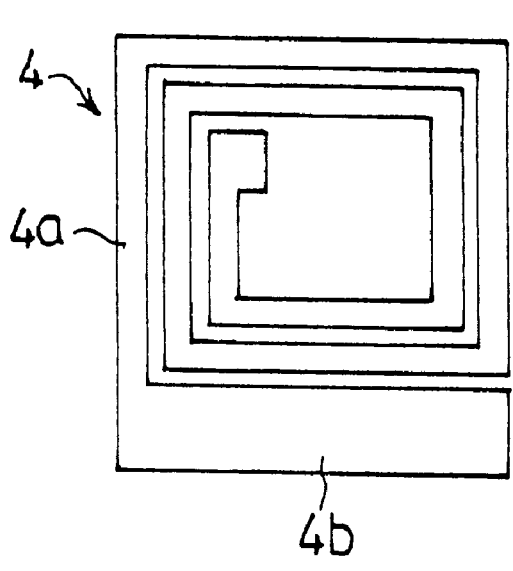
FIG. 2a is a plan view illustrating a pattern of an electric conductor on the side of the front surface.
Figure 2B:
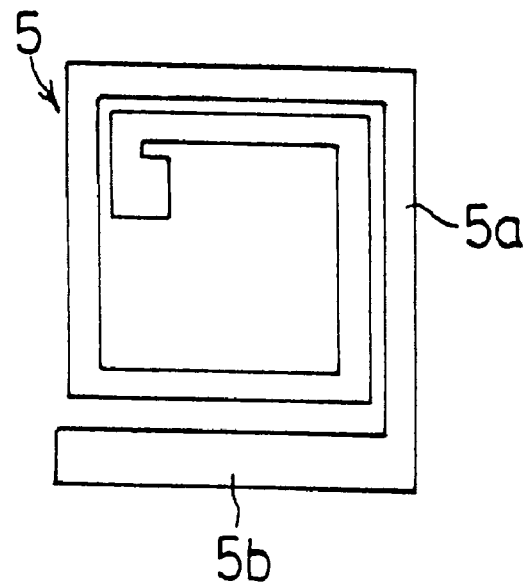
FIG. 2b is a plan view illustrating a pattern of an electric conductor on the side of the back surface.
Figure 2C:
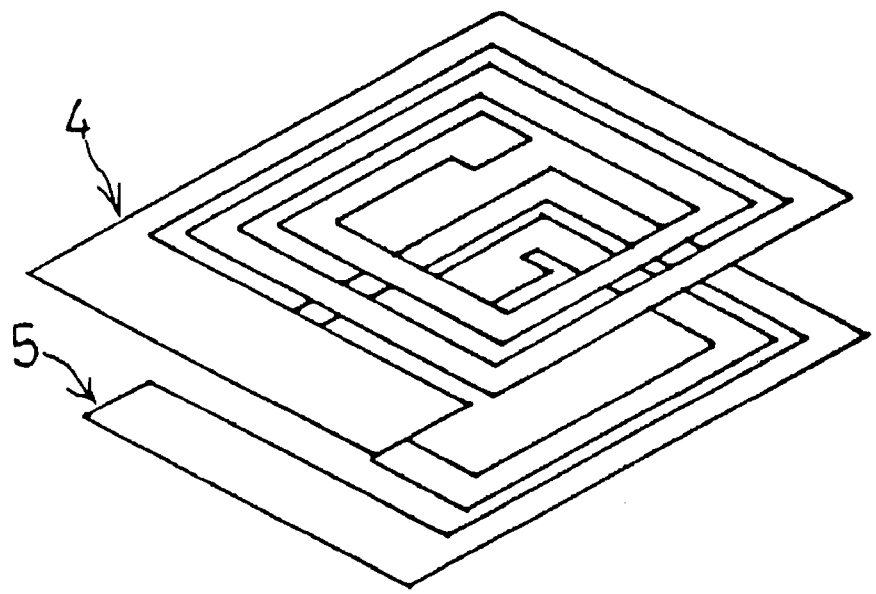
FIG. 2c is a diagram explaining a positional relationship of the electric conductors on the front and back surfaces.

An embodiment of the present invention will now be described in detail with reference to the drawings. An ID information display system is constituted by a reflected wave analyzer and an LC resonance tag. FIG. 1 illustrates the LC resonance tag 1 in the form of a thin sheet obtained by adhering metallic electric conductors 4 and 5 on both surfaces of a dielectric film 2 via an adhesive 3. Referring to FIGS. 2a, 2b and 2c, the electric conductors 4 and 5 have capacitor patterns 4b, 5b of relatively large areas continuing to the ends on the outer side of coil patterns 4a, 5a of a rectangular spiral shape. Ends of the inner peripheries of the front and back coil patterns 4a and 5a are connected together through an electric conductor 6 shown in FIG. 1, thereby forming an LC serially-connected closed circuit made up of inductances of the coil patterns 4a, 5a and capacitances of the capacitor patterns 4b, 5b. A resonance frequency of the LC tag 1 varies depending upon the numbers of turns of the coil patterns 4a, 5a and the areas of the capacitor patterns 4b, 5b. There are used many kinds of LC resonance tags 1 having dissimilar resonance frequencies over a range of from a short wave zone to an ultra-short wave zone.

The electric conductors 4 and 5 are formed by etching or by such means as printing an electrically conducting paste. As the dielectric film 2, there can be used PP (polypropylene), PET (polyethylene terephthalate) or PI (polyimide). The adhesive 3 will preferably have a dielectric constant nearly equal to the dielectric constant of the dielectric film 2.

Figure 3:
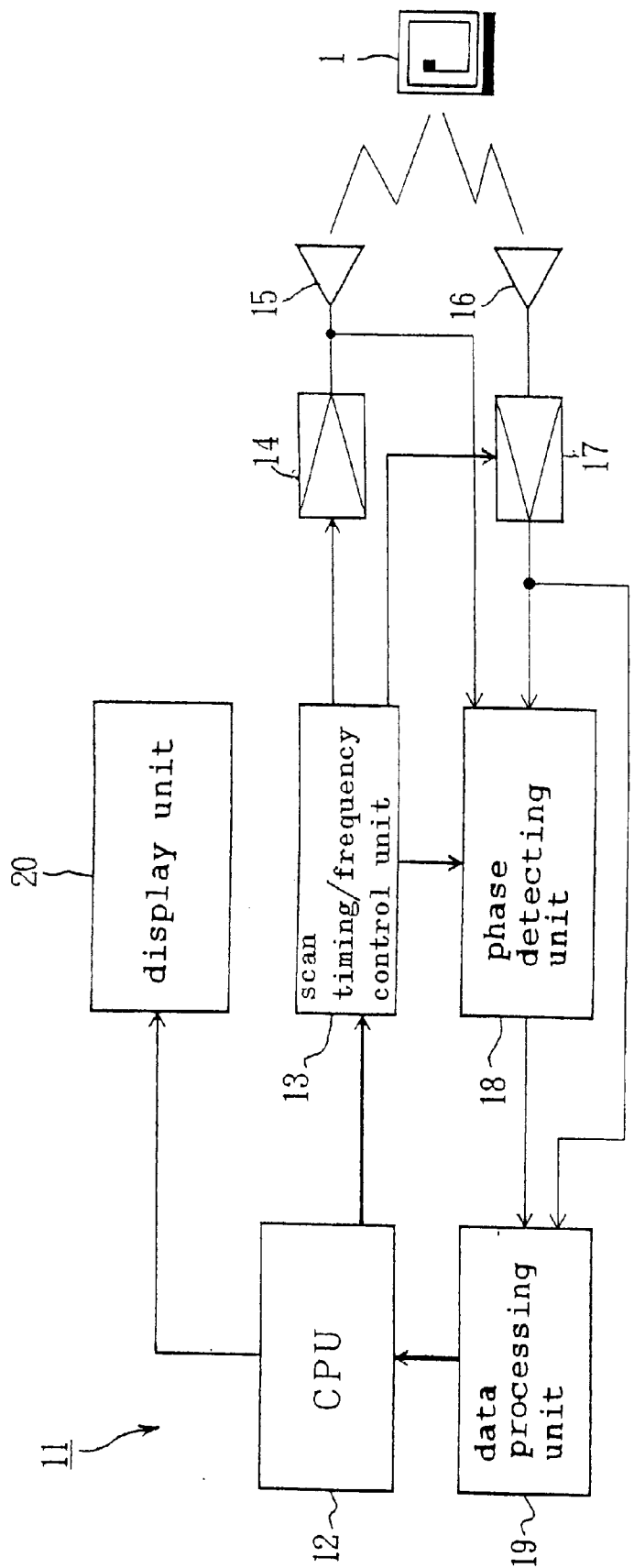
FIG. 3 is a block diagram of a reflected wave analyzer.

FIG. 3 illustrates a reflected wave analyzer 11, wherein a CPU 12 controls a scan timing/frequency control unit 13 which controls a transmission amplifier 14 to transmit waves from a transmission antenna 15. Based upon sweep frequency band data of a combination of scan interval data and a preset frequency channel of the LC resonance tag 1, the scan timing/frequency control unit 13 scans a preset frequency band maintaining a predetermined scan interval.

The waves falling on a reception antenna 16 is amplified through a reception amplifier 17 and is inputted to a phase detector unit 18 together with the output of the transmission antenna 15. The output of the phase detector unit 18 is sampled by an A/D converter in a data processing unit 19 in synchronism with the reference clocks, and is subjected to a processing for removing noise and to a processing for conversion into a binary form. The binary data of the received waveform is written into a memory in the data processing unit 19.

In the rewritable memory are stored pattern data of reference waveforms using reflected waves of LC resonance tags of the frequency channels as models, and voice display data or picture display data corresponding to the LC resonance tags. The data processing unit 19 has a comparing/analyzing function based on a pattern matching which is generally employed in the field of image processing, and collates pattern data of reference waveform with pattern data of received waveform. Furthermore, a host computer is connected to the reflected wave analyzer 11, so that pattern data of reference waveform in the memory or the display data can be newly written or rewritten.

A display unit 20 comprises an amplifier and a speaker, and voice information based on voice display data is produced from the speaker. Though not diagramed, a picture monitor device may be connected so that picture information based on the picture display data can be watched.

Described below is the principle of operation of the ID information display system. Here, the transmission frequency band of the reflected wave analyzer 11 is divided into 10 channels, and 10 kinds of LC resonance tags 1 are used having, as resonance frequencies, nearly intermediate frequencies in the bands of each of the channels.

Figure 4:
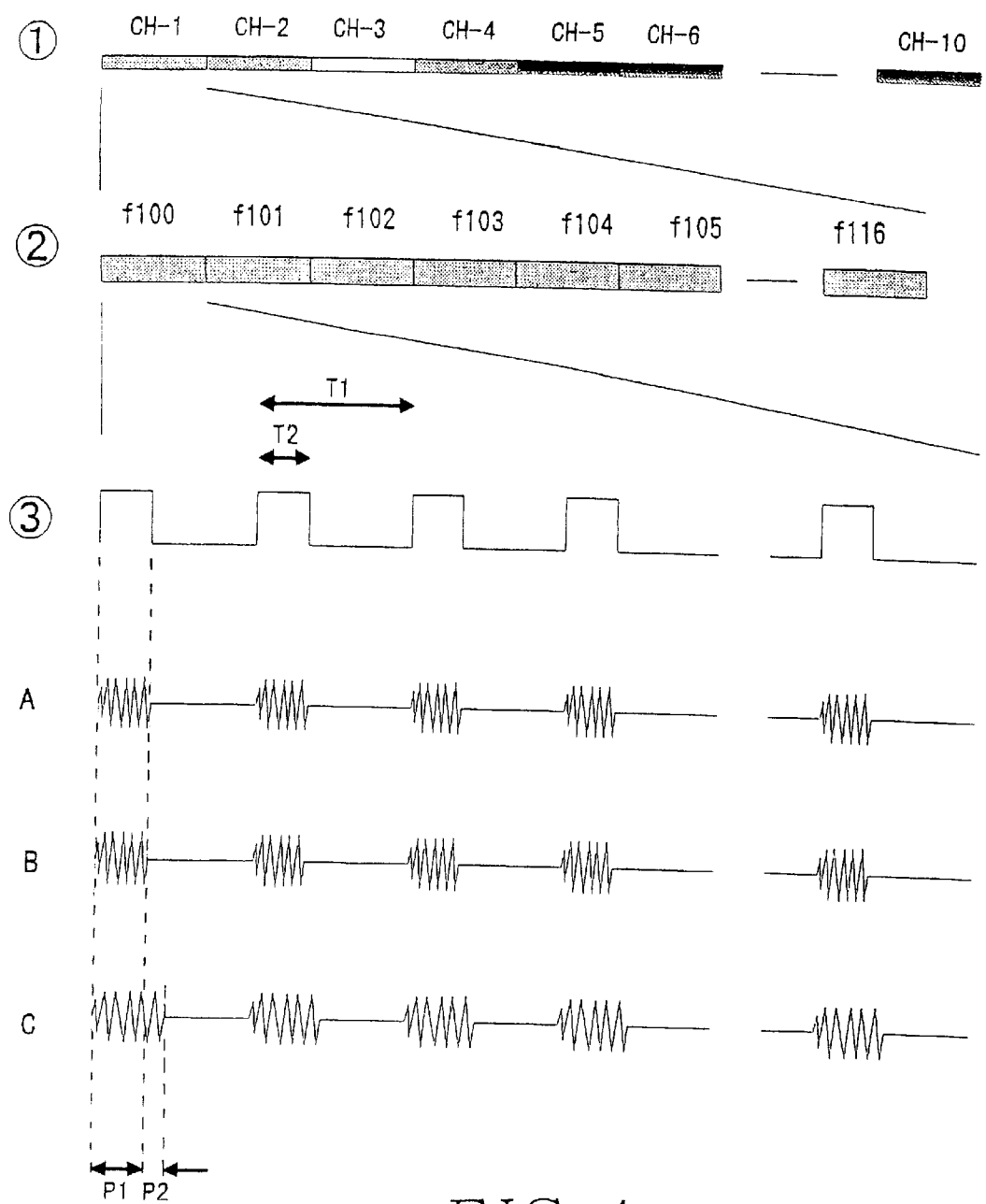
FIG. 4 is a timing chart illustrating the scanning operation of the reflected wave analyzer.

The reflected wave analyzer 11 successively scans the frequency bands from CH-1 (channel 1) up to CH-10 shown in FIG. 4①). Each channel is constituted by frequency bands of 17 stages (fn00 to fn16) as shown in, for example, FIG. 4②. The analog sweeping in which the frequency continuously changes is not effected but, instead, the frequency sweeping is effected over 17 stages for each of the channels by stepwisely changing the frequency like 5.00 MHz, 5.01 MHz, 5.02 MHz, 5.03 MHz,—being controlled by the scan timing/frequency control unit 13.

Referring to FIG. 4③, a frequency fn(i) in each of 17 stages is emitted for a predetermined period of time T2 (several microseconds), i.e., intermittently emitted repetitively a plural number of times maintaining a predetermined recurring timing T1 (several tens of microseconds) to maintain performance against noise. Thereafter, a frequency fn(i+1) of a next stage is emitted.

FIG. 4③ shows a timing of a transmission output gate, wherein A represents a waveform of electromagnetic waves emitted from the transmission antenna, and B represents a waveform inputted to the reception antenna when there is no LC resonance tag in the sensing region of the reception antenna.

On the other hand, when there exists, in the sensing region of the antenna, an LC resonance tag that resonates at a frequency in the frequency band of the transmitted electromagnetic waves, the waves reflected by the LC resonance tag 1 are superposed on the electromagnetic waves directly arriving at the reception antenna 16 from the transmission antenna 15, and falls on the reception antenna 16 to form a waveform as represented by C.

In the section (emission time) of P1, in this case, the phase difference for the transmitted waveform represented by A differs between B and C (A–B≠A–C). Referring to C, a reflected wave delayed by the LC resonance tag 1 is recognized in a section P2 that follows P1.

Figure 5:
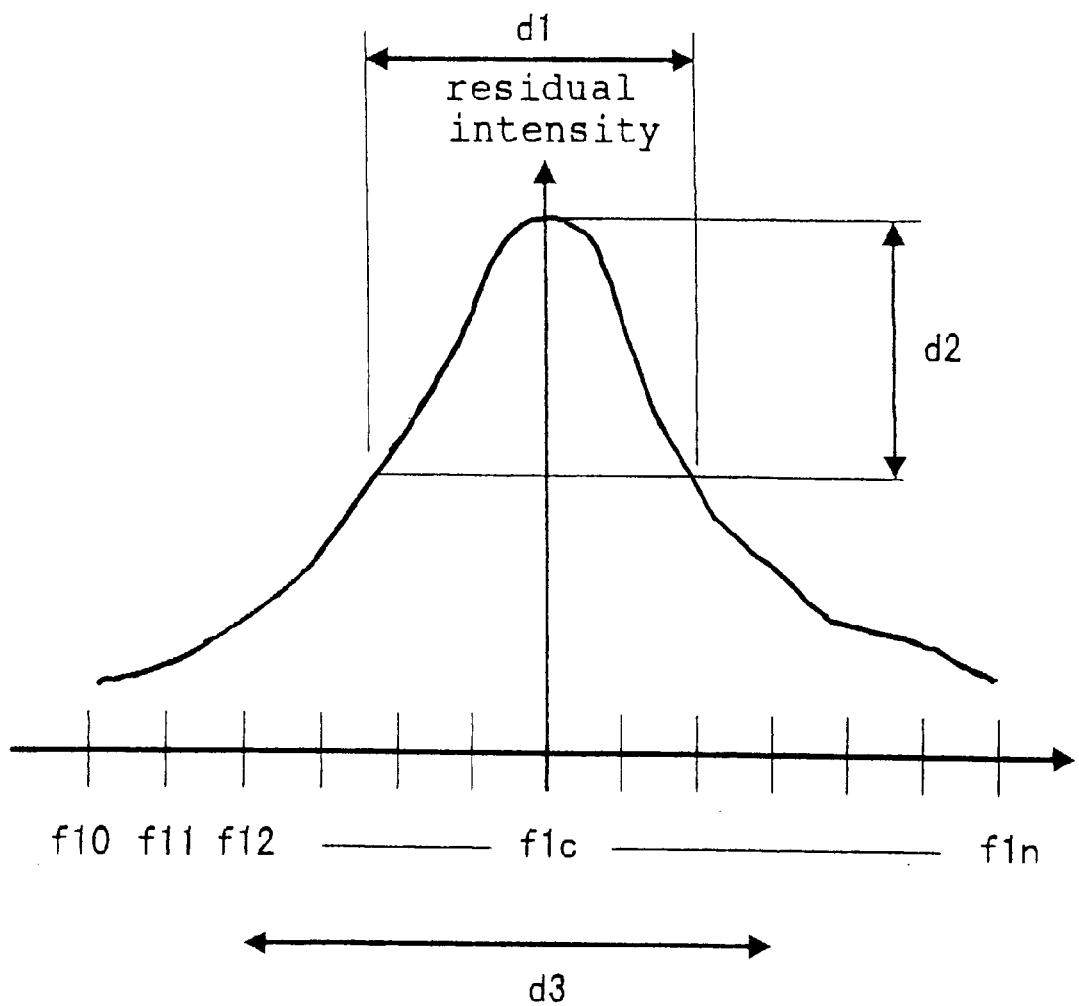
FIG. 5 is a graph illustrating a pattern of reflected waveform obtained by sampling the reflected wave of the LC resonance tag.

A resonance level pattern is obtained as shown in FIG. 5 when the reception levels of the delayed portion (P2) of the reflected waves only of the same frequency emitted a plural number of times maintaining a predetermined timing, are integrated and when the reception levels of the reflected waves of frequencies (fn0 to fn16) in one channel are subjected to the A/D conversion and are sampled.

The reflected wave analyzer 11 repetitively emits the same frequency fn(i) to remove white noise and impulse noise, and specifies a frequency channel of the LC resonance tag 1 when a phase difference of C from B is recognized in the section P1 as represented by C and when a resonance level pattern in the section P2 satisfies a resonance sharpness based on d1 and d2 of FIG. 5 and satisfies predetermined values over an error allowable range for a design frequency denoted by d3. The reflected wave analyzer 11, then, produces a voice display, a picture display or both corresponding to the LC resonance tag.

Here, when one kind of LC resonance tag among LC resonance tags of 10 channels is attached to an article, ten kinds of articles can be discriminated. When the LC resonance tags of any five channels are used in combination out of those of 10 channels, the number of kinds that can be discriminated becomes $_{10}C_5$=252 from the combination of permutations. When those of any 6 channels are used in combination out of those of 42 channels, then, $_{42}C_6$=5,245, 786. Thus, the number of transmission/reception channels and the number of frequency channels of LC resonance tags can be increased, as required, in order to arbitrarily increase the number that can be discriminated and to cope with a tremendously large number of kinds of articles.

Figure 6:
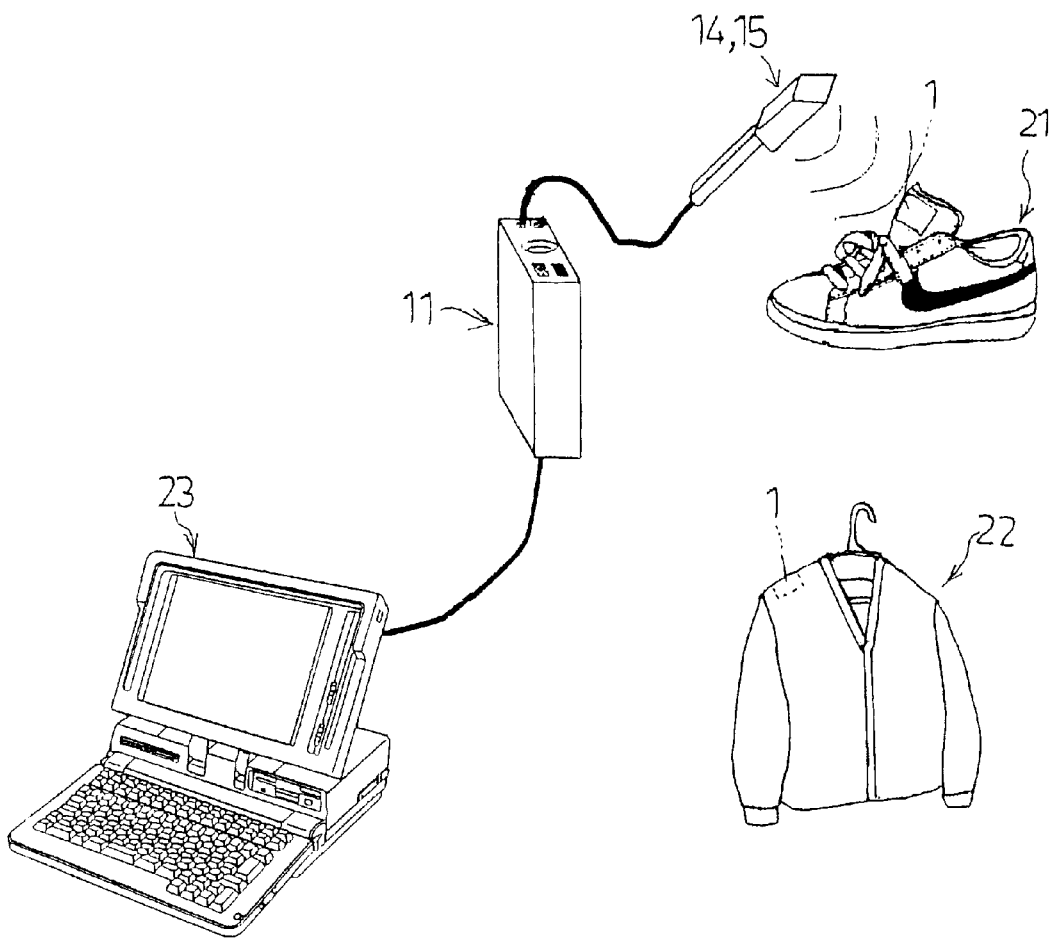
FIG. 6 is a diagram illustrating an embodiment of a method of displaying information.

Next, described below is a method of displaying ID information by the above-mentioned ID information display system. The owner of a trademark right or a design right offers, to a licensee who produces products, LC resonance tags 1 of a number equal to the contracted number of the articles to be produced. The LC resonance tags 1 are incorporated in the license articles when they are being produced. Referring to FIG. 6, reference numeral 21 denotes a shoe and 22 denotes a jacket produced according to the contraction of license. The LC resonance tags 1 are incorporated in the tongue portion of the shoe 21 or in the shoulder portion of the jacket 22; i.e., the presence of the LC resonance tags 1 cannot be visually perceived.

The transmission antenna 15 and reception antenna 16 of the reflected wave analyzer 11 are brought close to a true article, and the reflected wave analyzer 11 is actuated. Then, resonance frequency channels of LC resonance tags 1 that are not appearing on the surface of the article are specified, display data related to the channels are read out from the memory, and voice messages such as brand and name of the article are produced from the speaker to inform that the article is a true one. The display data may not be limited to the brand, name, etc., but may include explanation of the article, letting the consumers know correct messages related to the article at the shop. Moreover, the ID may be displayed and the article may be explained on a picture monitor.

To sell a new product, the channel data or the display data of LC resonance tags in the product are allocated through a magnetic recording medium such as a floppy disk or the like, and the data of the reflected wave analyzer 11 are updated by a computer 23, or the rightful person updates the data of the reflected wave analyzer on-line through a communication circuit.

Figure 7:
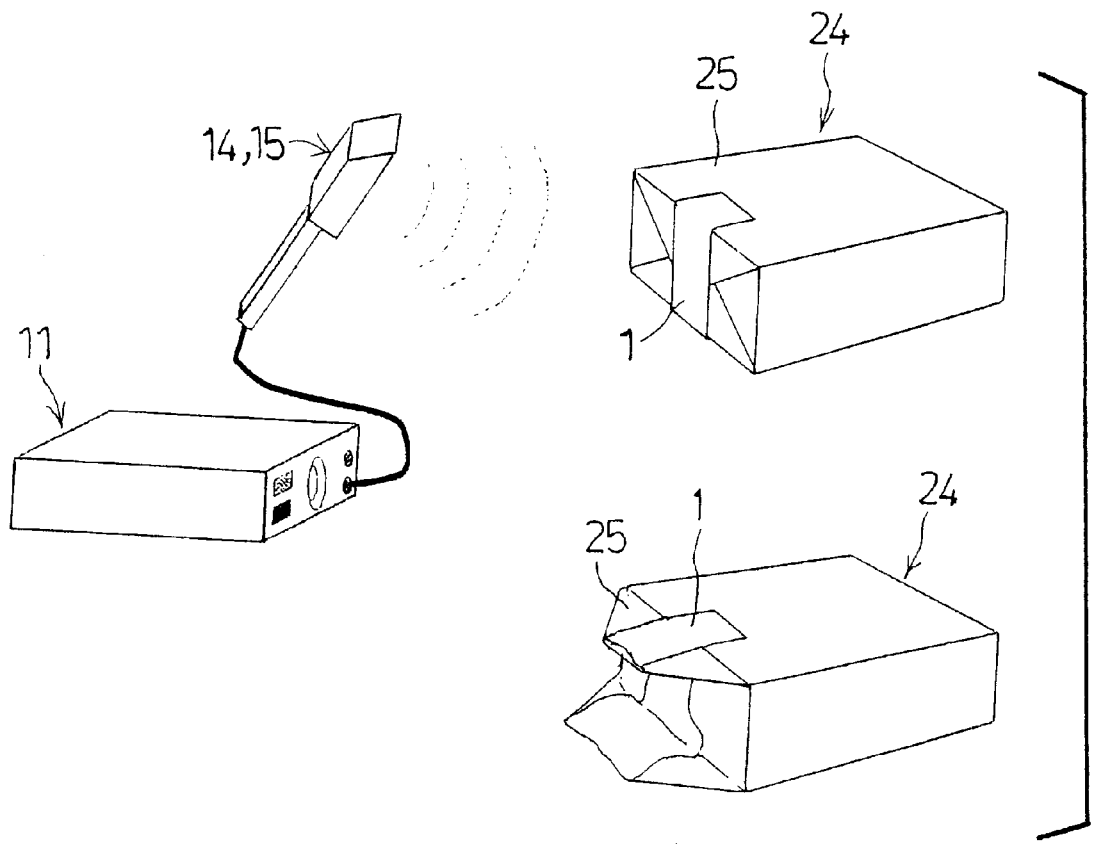
FIG. 7 is a diagram illustrating an embodiment of a method of displaying information.
Figure 8:
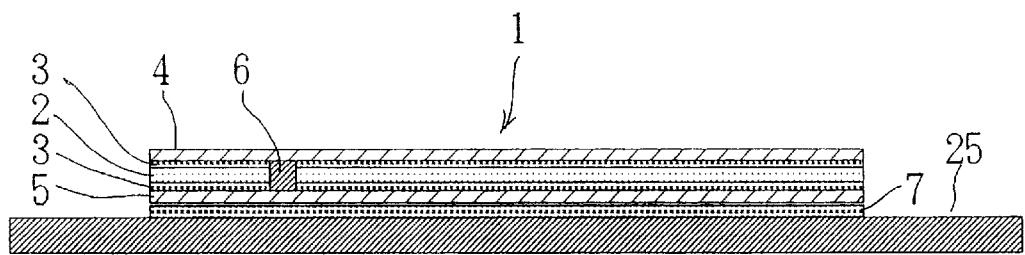
FIG. 8 is a sectional view of an LC resonance tag used for the method of displaying information.

FIG. 7 illustrates another embodiment in which the LC resonance tag 1 is used in the seal of a wrapping paper 25 to detect whether an article 24 supplied in a wrapped state is once opened or not. Referring to FIG. 8, the LC resonance tag 1 has an adhesive layer 7 for sticking formed on one surface thereof, and is stuck to the wrapping paper 25. Though not diagramed, a masking film may be stuck to the other surface.

The peeling strength of the adhesive agent 7 for sticking applied onto the LC resonance tag 1 is so controlled during the stage of production as will be stronger than the peeling strength of the adhesive 3 that adheres the dielectric film 2 to the metal conductors 4, 5. When it is attempted to peel off the LC resonance tag 1 that has been stuck to the wrapping paper 25, the dielectric film 2 is peeled off the electric conductors 4, 5, the electric conductors 4, 5 on the front and back surfaces being separated away from each other so that the LC resonance tag loses its function. Therefore, the article furnished with the LC resonance tag 1 that is unsealed is detected by the reflected wave analyzer 11.

The dielectric film 2 and the electric conductors 4, 5 are in the form of very thin films. Therefore, it is difficult to restore the original shape of the LC resonance tag 1 once it is peeled off. Even if the dielectric film 2 and the electric conductors 4, 5 could be adhered again, it is almost impossible to make the electric conductors 4, 5 on the front and back surfaces conductive to each other so that the resonance frequency is brought to be the same as the initial resonance frequency.

Figure 9:
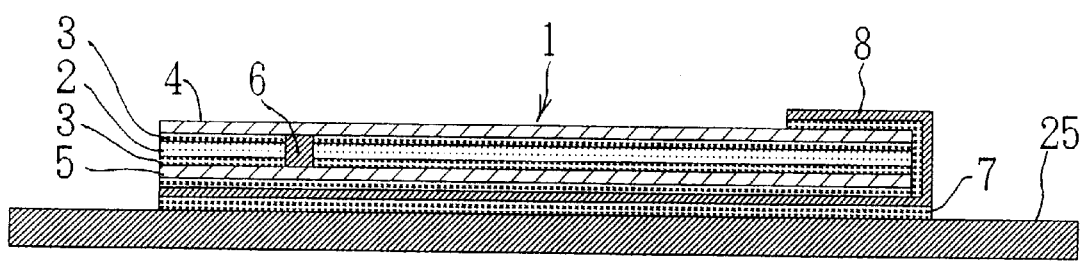
FIG. 9 is a sectional view of an LC resonance tag used for the method of displaying information.

FIG. 9 illustrates a further embodiment in which a masking sheet 8 constituted by a thin metal foil is adhered over the upper and lower both surfaces of the LC resonance tag 1, in order to set a resonance frequency of the LC resonance tag 1 relying upon a capacitance in a state where the masking sheet 8 is adhered and a reactance of the conductor pattern. When the LC resonance tag 1 is peeled off the article and the masking sheet 8 is cut, the capacitance changes. Therefore, even if the LC resonance tag 1 is adhered again, the fact that the article was once unsealed is detected by the reflected wave analyzer 11.

According to the method of displaying information by using the LC resonance tag of the present invention as described above, the LC resonance tag is incorporated in the article during the step of producing the articles, and it is allowed to make sure the history of the article after it is produced through up to when it is sold, making it possible to verify that it is a true article. The LC resonance tag incorporated in the article is invisible by eyes, does not affect the appearance of the article, and its presence will not be learned. Besides, the LC resonance tag is very difficult to forge compared to bar-code tags. Use of plural LC resonance tags in combination makes it possible to cope with a tremendously large number of kinds of articles, and exhibits effect in excluding illegal imitation articles and in controlling the number of license articles that are produced.

With the article being sealed with the LC resonance tag, furthermore, the article that is once unsealed can be detected since the LC resonance tag is destroyed, making it possible to effectively avoid trouble related to guaranteeing the quality or trouble such as pulling out the article from the package or replacing the article in the package.

It should be noted that the present invention is in no way limited to the above-mentioned embodiments only but can be modified in a variety of ways within the technical scope of the invention, and the invention encompasses these modified embodiments, as a matter of course.

What is claimed is:

1. A method for discriminating articles for use in authenticating the articles and identifying a manufacture comprising:

associating a resonance tag having a predetermined resonance frequency with an article at the time of being produced;

affixing the resonance tag sealing the article so that upon removal the resonance tag is disabled, whereby unauthorized tampering is detected;

storing pattern data characteristics of the predetermined resonance frequency of the resonance tag and corresponding identifying data identifying the article and the manufacturer;

transmitting a frequency band to be received by the resonance tag;

receiving the predetermined resonance frequency emitted by the resonance tag;

matching the received predetermined resonance frequency with the stored pattern data characteristics and corresponding identifying data; and providing the corresponding identifying data to a user, whereby the article is discriminated from other unauthorized articles.

2. A method for discriminating articles as in claim 1 wherein:

the step of affixing comprising using an adhesive for applying the resonance tag to an article stronger than a peeling strength of an adhesive adhering the resonance tag together, whereby when the resonance tag is removed it is disabled.

3. A method for discriminating articles for use in authenticating the articles and identifying a manufacture comprising:
- associating a resonance tag having a predetermined resonance frequency with an article at the time of being produced;
- the resonance tag has upper and lower surfaces,
- adhering a metal toil used in forming the resonance tag over the upper and lower surfaces in order to set the predetermined resonance frequency, such that when unsealed a capacitance of the resonance tag changes, whereby tampering may be detected;
- storing pattern data characteristics of the predetermined resonance frequency of the resonance tag and corresponding identifying data identifying the article and the manufacturer;
- transmitting a frequency band to be received by the resonance tag;
- receiving the predetermined resonance frequency emitted by the resonance tag;
- matching the received predetermined resonance frequency with the stored pattern data characteristics and corresponding identifying data; and
- providing the corresponding identifying data to a user,
- whereby the article is discriminated from other unauthorized articles.

4. A system for discriminating authorized articles from unauthorized articles comprising:
- a resonance tag affixed to an article at the time of being produced and having a predetermined resonance frequency;
- a first adhesive used to affix said resonance tag to the article;
- a second adhesive used to form said resonance tag, said first adhesive having a peeling strength stronger than a pealing strength of the second adhesive, whereby when the resonance tag is removed it is disabled;
- means for storing pattern data characteristics of the predetermined resonance frequency of the resonance tag and corresponding identifying data identifying the article as being authorized;
- a transmitter, said transmitter transmitting a frequency band to be received by said resonance tag;
- a receiver, said receiver receiving the predetermined resonance frequency emitted by said resonance tag;
- means for matching the received predetermined resonance frequency with the stored pattern data characteristics and corresponding identifying data; and
- a display, said display displaying the corresponding identifying data,
- whereby the article is discriminated from other articles.

5. A system for discriminating authorized articles from unauthorized articles comprising:
- a resonance tag affixed to an article at the time of being produced and having a predetermined resonance frequency;
- said resonance tag has upper and lower surfaces,
- a metal foil used in forming said resonance tag is placed over the upper and lower surfaces in order to set the predetermined resonance frequency, such that when the article is unsealed a capacitance of the resonance tag changes, whereby unsealing may be detected;
- means for storing pattern data characteristics of the predetermined resonance frequency of the resonance tag and corresponding identifying data identifying the article as being authorized;
- a transmitter, said transmitter transmitting a frequency band to be received by said resonance tag;
- a receiver, said receiver receiving the predetermined resonance frequency emitted by said resonance tag;
- means for matching the received predetermined resonance frequency with the stored pattern data characteristics and corresponding identifying data; and
- a display, said display displaying the corresponding identifying data,
- whereby the article is discriminated from other articles.

6. A method of discriminating articles for use in authenticating the articles comprising:
- associating a resonance tag having a plurality of different resonance frequency with an article at the time of being produced;
- transmitting a plurality of preset frequency bands maintaining a predetermined scan interval to be received by the resonance tag;
- receiving the plurality of different resonance frequencies emitted by the resonance tag;
- detecting a phase difference between each of the frequencies in the plurality of preset frequency bands and each of the plurality of different resonance frequencies emitted by the resonance tag;
- compiling a resonance level pattern having a resonance sharpness from the phase differences;
- storing pattern data characteristics of the resonance sharpness associated with the resonance tag;
- storing identifying data comprising data sufficient to authenticate the article including brand and name of the article;
- linking the resonance sharpness associated with the resonance tag with corresponding stored identifying data;
- matching the resonance sharpness with the stored pattern data characteristics; and
- providing the corresponding identifying display data to a user based upon the matching of the resonance sharpness with the stored pattern data characteristics and the linking of the corresponding stored identifying data,
- whereby it is possible to discriminated the article from authorized and unauthorized articles.

7. A method for discriminating articles as in claim 6 further comprising:
- affixing the resonance tag sealing the article so that upon removal the resonance tag is disabled, whereby unauthorized tampering is detected.

8. A method of discriminating articles as in claim 7 wherein:
- the step of affixing comprising using an adhesive for applying the resonance tag to an article stronger than a peeling strength of an adhesive adhering the resonance tag together, whereby when the resonance tag is removed it is disabled.

9. A method of discriminating articles as in claim 6 further comprising:
- the resonance tag has upper and lower surfaces,
- adhering a metal foil used in forming the resonance tag over the upper and lower surfaces in order to set the predetermined resonance frequency, such that when unsealed a capacitance of the resonance tag changes, whereby tampering may be detected.

* * * * *